(12) United States Patent
John et al.

(10) Patent No.: US 11,879,562 B2
(45) Date of Patent: Jan. 23, 2024

(54) SOLENOID OPERATED PRESSURE REGULATOR CUM SHUT OFF VALVE FOR INFLATION SYSTEM

(71) Applicant: GOODRICH CORPORATION, Charlotte, NC (US)

(72) Inventors: Poly Puthur John, Bangalore (IN); Vasanthakumara Jnanegowda, Bangalore (IN)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 17/833,725

(22) Filed: Jun. 6, 2022

(65) Prior Publication Data

US 2023/0110245 A1 Apr. 13, 2023

(30) Foreign Application Priority Data

Oct. 7, 2021 (IN) .............................. 202141045668

(51) Int. Cl.
| *F16K 3/24* | (2006.01) |
| *B64D 25/14* | (2006.01) |
| *F16K 31/06* | (2006.01) |
| *F16K 31/40* | (2006.01) |

(52) U.S. Cl.
CPC .............. *F16K 3/246* (2013.01); *B64D 25/14* (2013.01); *F16K 31/0679* (2013.01); *F16K 31/406* (2013.01)

(58) Field of Classification Search
CPC .... F16K 3/246; F16K 31/0679; F16K 31/406; F16K 31/363
See application file for complete search history.

(56) References Cited

U.S. PATENT DOCUMENTS

| 1,047,774 | A | * | 12/1912 | Eynon | ..................... F16K 1/446 |
| | | | | | 137/614.18 |
| 1,055,161 | A | * | 3/1913 | Geissinger | .............. E03C 1/108 |
| | | | | | 251/34 |
| 1,605,824 | A | * | 11/1926 | Erickson | ............. F16K 31/0679 |
| | | | | | 251/75 |
| 4,011,889 | A | * | 3/1977 | Smith | ..................... F16K 3/246 |
| | | | | | 137/630.19 |

(Continued)

FOREIGN PATENT DOCUMENTS

DE 1523424 2/1969

OTHER PUBLICATIONS

European Patent Office, European Search Report dated Feb. 16, 2023 in Application No. 22196114.7.

*Primary Examiner* — Umashankar Venkatesan
(74) *Attorney, Agent, or Firm* — SNELL & WILMER L.L.P.

(57) ABSTRACT

A valve arrangement for a pressurized fluid source includes a valve housing comprising an inlet, an outlet, and a main fluid channel extending along a longitudinal axis of the valve housing. The valve arrangement further includes a spool and a regulating poppet valve coaxially located in the main fluid channel. The spool and a regulating poppet valve are both configured to translate along the longitudinal axis of the valve housing independent of each other. In response to the spool moving to an open position, the poppet valve regulates the flow of a pressurized fluid flowing from the inlet to the outlet of the valve housing.

20 Claims, 8 Drawing Sheets

(56) References Cited

U.S. PATENT DOCUMENTS

| | | | |
|---|---|---|---|
| 8,126,636 B2 | 2/2012 | Jauss | |
| 8,678,033 B2* | 3/2014 | Bengea | F16K 31/0613 |
| | | | 137/625.65 |
| 9,422,783 B2* | 8/2016 | Gustafson | E21B 33/0355 |
| 10,443,746 B2* | 10/2019 | Okamura | F16K 11/0716 |
| 10,612,723 B2* | 4/2020 | John | F16K 31/0655 |
| 10,663,079 B2* | 5/2020 | John | F16K 31/42 |
| 10,712,754 B2 | 7/2020 | Quaglia et al. | |
| 10,946,971 B2 | 3/2021 | John et al. | |
| 11,092,252 B2* | 8/2021 | John | F16K 31/0655 |
| 2016/0230904 A1 | 8/2016 | Zarrabi et al. | |
| 2019/0249789 A1 | 8/2019 | John et al. | |
| 2019/0353263 A1 | 11/2019 | John | |
| 2020/0180848 A1 | 6/2020 | Synder et al. | |
| 2020/0191279 A1 | 6/2020 | John et al. | |
| 2020/0300380 A1 | 9/2020 | John et al. | |
| 2021/0181773 A1 | 6/2021 | Nagaraj et al. | |
| 2021/0284119 A1* | 9/2021 | Kuhl | B60T 13/686 |
| 2022/0380058 A1* | 12/2022 | John | F16K 37/0075 |
| 2022/0402618 A1* | 12/2022 | Palaniappan | B64D 45/00 |

\* cited by examiner

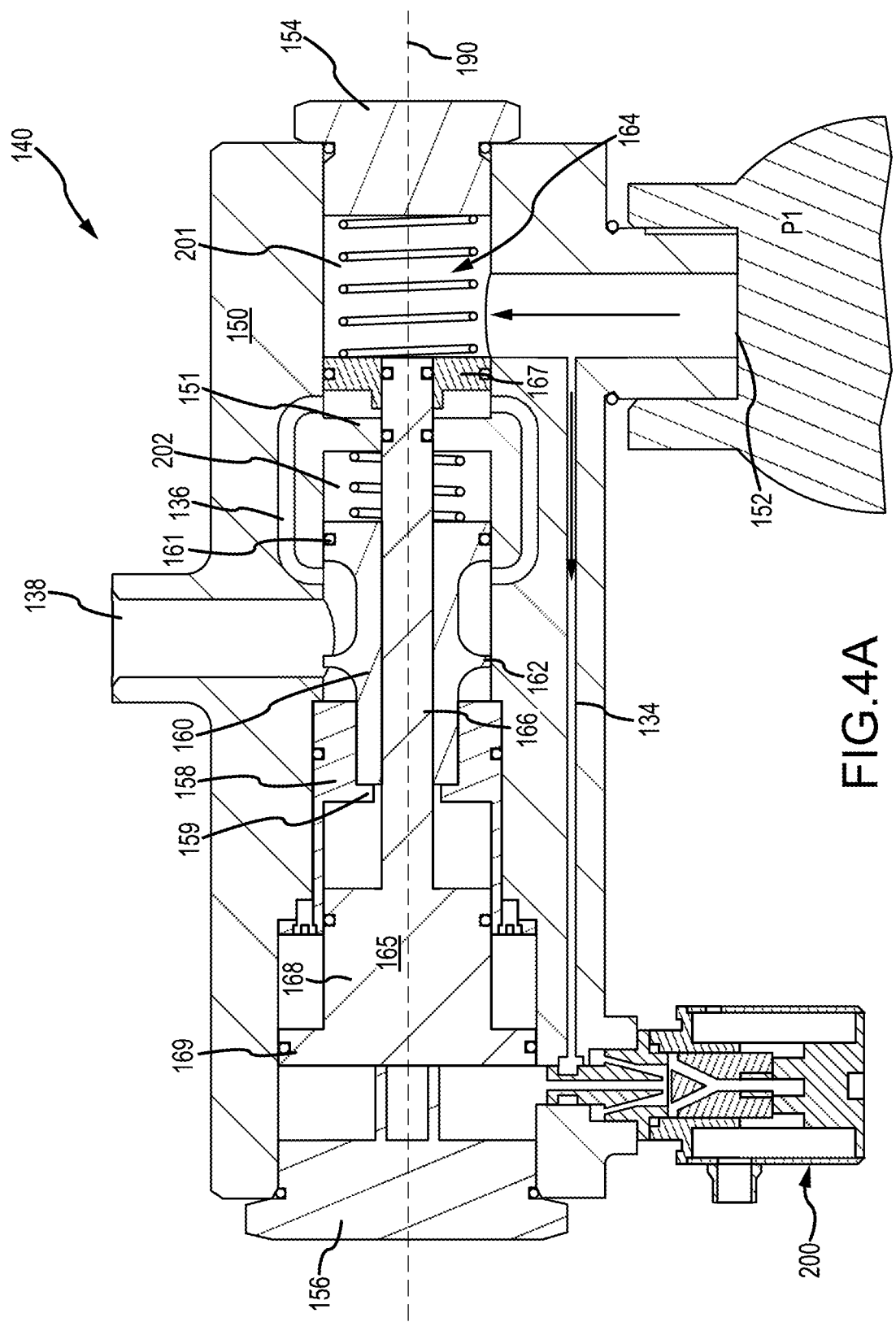

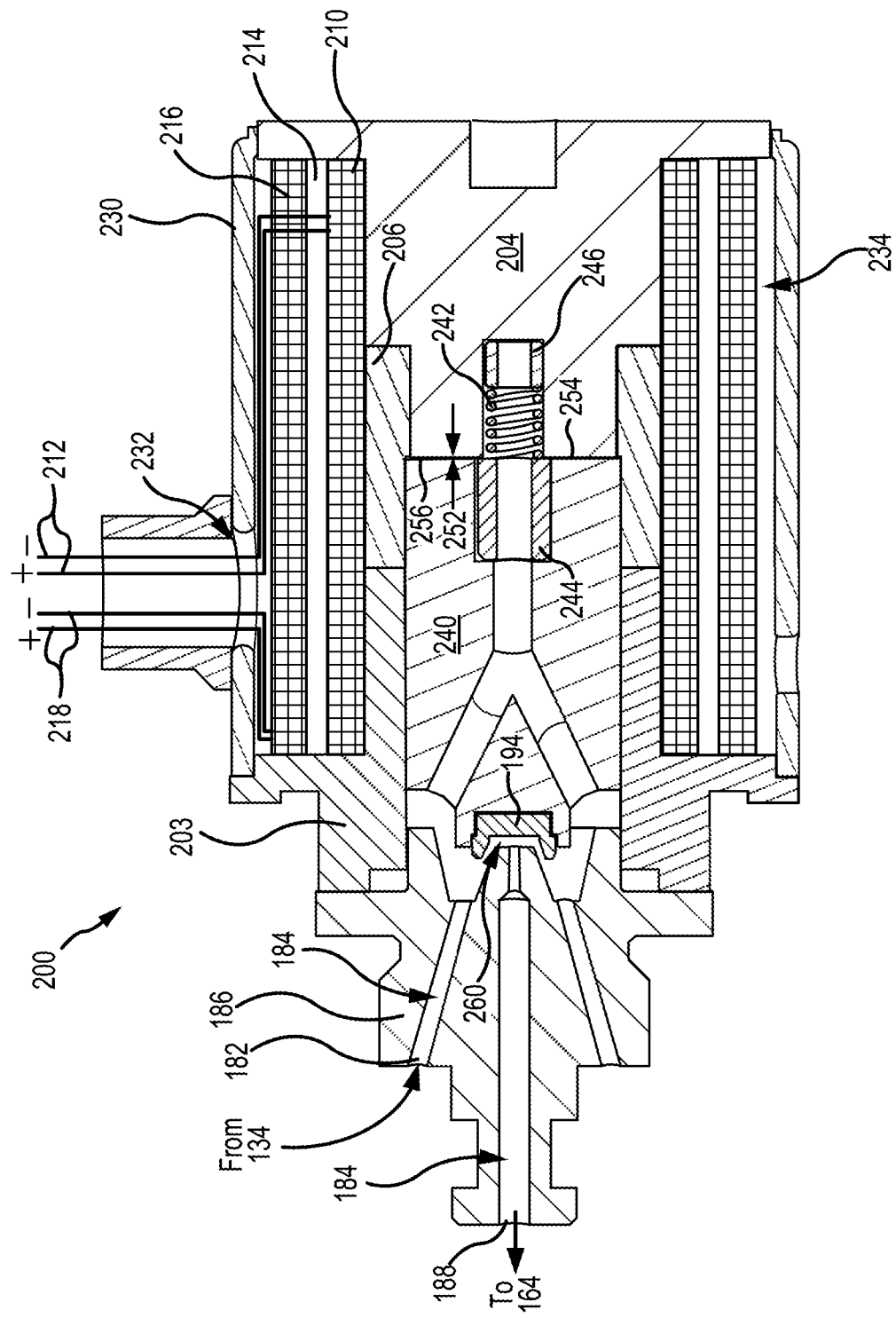

SOLENOID OPERATED PRESSURE REGULATOR CUM SHUT OFF VALVE FOR INFLATION SYSTEM

CROSS-REFERENCE TO RELATED APPLICATIONS

This application claims priority to, and the benefit of, India Patent Application No. 20214105668, filed Oct. 7, 2021 (DAS Code 96CB) and titled "SOLENOID OPERATED PRESSURE REGULATOR CUM SHUT OFF VALVE FOR INFLATION SYSTEM," which is incorporated by reference herein in its entirety for all purposes.

FIELD

The present disclosure relates generally to inflatable fluid sources and, more particularly, to a valve arrangement for a pressurized fluid source of an evacuation assembly.

BACKGROUND

Inflatable evacuation systems may be found on various structures, including aircraft, boats, offshore drilling platforms and the like. The systems are typically equipped with an inflatable or an inflatable device, such as, for example, an inflatable slide or an inflatable raft, configured to facilitate rapid evacuation of persons in the event of an emergency. Such inflatables are typically stored in an uninflated condition on the structure in a location readily accessible for deployment. For example, an evacuation slide for a commercial aircraft is stored in an uninflated condition in a case or compartment located proximate an emergency exit.

Systems used to inflate evacuation slides typically employ a gas stored within a cylinder or tank at high pressure, which is discharged into the evacuation slide (or into an inflatable tube comprised within the evacuation slide) within a specific time period. This may be accomplished, for example, by opening a main inflation valve that connects the high-pressure gas to the inflatable tube.

SUMMARY

A valve arrangement for a pressurized fluid source is disclosed. The valve arrangement comprises a valve housing comprising an inlet, an outlet, and a main fluid channel extending along a longitudinal axis of the valve housing, a spool located in the main fluid channel, the spool configured to translate along the longitudinal axis of the valve housing, and a poppet valve located around the spool, the poppet valve configured to translate along the longitudinal axis of the valve housing.

In various embodiments, the poppet valve is configured to translate along the longitudinal axis of the valve housing independent of the spool.

In various embodiments, the spool comprises a first piston, a second piston, and a third piston.

In various embodiments, the valve arrangement further comprises a first spring adjacent the first piston.

In various embodiments, the valve arrangement further comprises a second spring adjacent the poppet valve.

In various embodiments, the poppet valve is disposed between the first piston and the second piston.

In various embodiments, the poppet valve comprises a first regulator piston and a second regulator piston.

In various embodiments, the valve arrangement further comprises a solenoid valve configured to open and close the valve arrangement, and a pilot feed channel whereby the solenoid valve is in fluid communication with the valve inlet.

In various embodiments, the valve arrangement further comprises a fluid feed channel, wherein the fluid feed channel is fluidly disconnected from the inlet of the valve housing when the spool is in a closed position, the fluid feed channel is fluidly connected with the inlet of the valve housing when the spool is in an open position, the outlet is fluidly connected with the inlet of the valve housing by the fluid feed channel when the spool is in the open position, and the poppet valve regulates a flow of a fluid from the inlet to the outlet when the spool is in the open position.

A valve arrangement for a pressurized fluid source is disclosed. The valve arrangement comprises a valve housing comprising an inlet, an outlet, and a main fluid channel extending along a longitudinal axis of the valve housing, a spool located in the main fluid channel, the spool configured to translate along the longitudinal axis of the valve housing between a closed position and an open position, and a poppet valve located coaxially with the spool, the poppet valve configured to translate along the longitudinal axis of the valve housing, wherein the poppet valve is fluidly disconnected from the inlet when the spool is in the closed position, and the poppet valve is fluidly connected with the inlet when the spool is in the open position.

In various embodiments, the main fluid channel fluidly connects the valve inlet and the valve outlet.

In various embodiments, the spool is configured to fluidly seal the valve outlet from the valve inlet when the spool is in the closed position.

In various embodiments, the valve arrangement further comprises a dual solenoid valve configured to open and close the valve assembly. The dual solenoid valve comprises a bobbin, a first solenoid coil located around the bobbin, a second solenoid coil located radially outward of the first solenoid coil, an insulating layer located between the first solenoid coil and the second solenoid coil, and a plunger biased away from the bobbin.

In various embodiments, the dual solenoid valve further comprises a fluid fitting defining a fluid path, wherein the fluid path is configured to fluidly connect the main fluid channel at a location of an end of the spool and the inlet of the valve housing.

In various embodiments, in the closed position, the dual solenoid valve is configured to seal an outlet of the fluid path defined by the fluid fitting from an inlet of the fluid path defined by the fluid fitting.

In various embodiments, the dual solenoid valve further comprises a valve seal configured to form a sealing interface with the fluid fitting when the valve assembly is in the closed position, and wherein in an open position, a gap is created between the fluid fitting and the valve seal, the gap being configured to allow fluid to flow from the inlet of the fluid path to the outlet of the fluid path.

In various embodiments, the valve arrangement further comprises a first set of lead wires electrically coupled to the first solenoid coil, and a second set of lead wires electrically coupled to the second solenoid coil.

An evacuation assembly is disclosed, comprising a pressurized fluid source, and a valve assembly configured to control a flow of pressurized fluid from the pressurized fluid source. The valve assembly comprises a valve housing comprising an inlet, an outlet, and a main fluid channel extending along a longitudinal axis of the valve housing, a spool located in the main fluid channel, the spool configured to translate along the longitudinal axis of the valve housing between a closed position and an open position, and a poppet valve located coaxially with the spool, the poppet valve configured to translate along the longitudinal axis of the valve housing.

In various embodiments, the evacuation assembly further comprises a dual solenoid valve configured to open and close and the valve assembly, the dual solenoid valve including a first solenoid coil and a second solenoid coil arranged in parallel with the first solenoid coil.

In various embodiments, the evacuation assembly further comprises an evacuation slide fluidly coupled to the valve outlet.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

FIG. 4A illustrates a cross-section view of a pressurized fluid source valve assembly taken along the line A-A in FIG. 3, with the valve assembly in a closed position, in accordance with various embodiments;

FIG. 5B illustrates a cross-section view of a dual solenoid valve in the open position, in accordance with various embodiments.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option.

Surface lines may be used throughout the figures to denote different parts but not necessarily to denote the same or different materials. Throughout the present disclosure, like reference numbers denote like elements. Accordingly, elements with like element numbering may be shown in the figures, but may not necessarily be repeated herein for the sake of clarity.

The systems and methods disclosed herein may find particular use in connection with aircraft evacuation assemblies. However, various aspects of the disclosed systems and methods may be adapted for performance in a variety of other inflatable assemblies, for example, inflatable raft assemblies, and/or any other assemblies having charged cylinders. As such, numerous applications of the present disclosure may be realized.

A regulator valve, as disclosed herein, allows for increased ease of manufacturing. In various embodiments, a regulator valve, as disclosed herein, includes shut off valve and regulator valve elements assembled in a concentric manner within a single cavity of a uniform shaped valve body. These two valving elements (i.e., the shut off valve (also referred to herein as a spool) and regulator valve (also referred to herein as a poppet valve) may function independently. A regulator valve, as disclosed herein, may allow for decreased efforts to fabricate, assemble, and perform health checks, which may tend to reduce system maintenance efforts.

Figure 1:
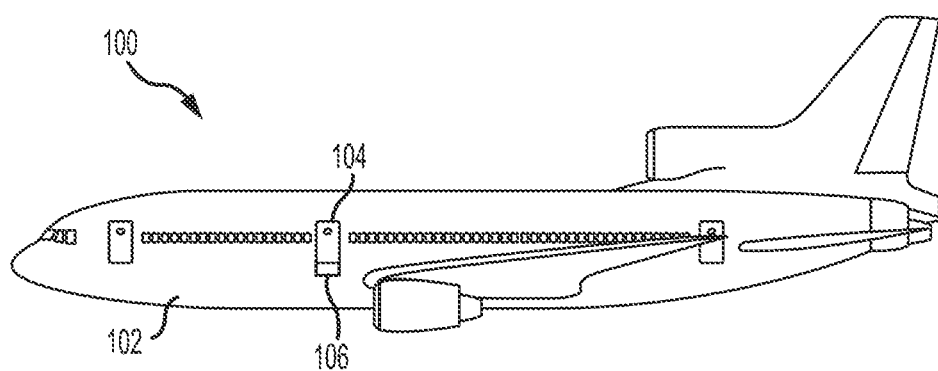
FIG. 1 illustrates an aircraft having an evacuation assembly, in accordance with various embodiments.

Referring now to FIG. 1, an aircraft 100 is shown. Aircraft 100 may include a fuselage 102 having plurality of exit doors, including exit door 104. Aircraft 100 may include one or more evacuation assemblies positioned near a corresponding exit door. For example, aircraft 100 includes an evacuation assembly 106 positioned near exit door 104. In the event of an emergency, exit door 104 may be opened by a passenger or crew member of aircraft 100. In various embodiments, evacuation assembly 106 may deploy in response to exit door 104 being opened or in response to another action taken by a passenger or crew member, such as the depression of a button, the actuation of a lever, or the like.

Figure 2:
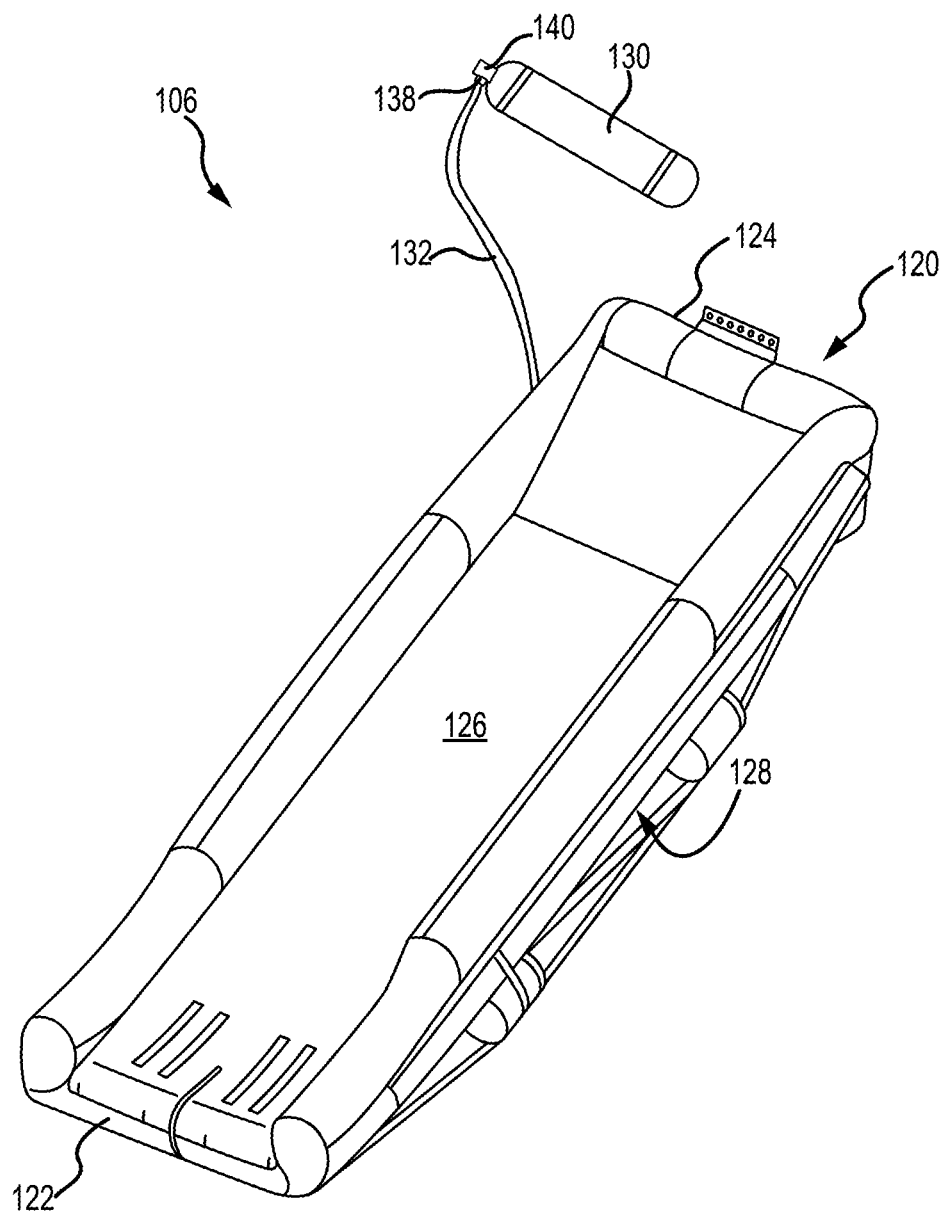
FIG. 2 illustrates an evacuation assembly with the evacuation slide in a deployed position, in accordance with various embodiments.

With reference to FIG. 2, additional details of evacuation assembly 106 are illustrated. In accordance with various embodiments, evacuation assembly 106 includes an evacuation slide 120 and a pressurized fluid source 130. In accordance with various embodiments, evacuation slide 120 includes a toe end 122 and a head end 124 opposite toe end 122. Head end 124 may be coupled to an aircraft structure (e.g., fuselage 102 in FIG. 1). In accordance with various embodiments, evacuation slide 120 is an inflatable slide. Evacuation slide 120 includes a sliding surface 126 and an underside surface 128 opposite sliding surface 126. Sliding surface 126 extends from head end 124 to toe end 122. During an evacuation event, underside surface 128 may be oriented toward an exit surface (e.g., toward the ground or toward a body of water). Evacuation slide 120 is illustrated as a single lane slide; however, evacuation slide 120 may comprise any number of lanes.

Evacuation assembly 106 includes pressurized fluid source 130 (also referred to as a charge cylinder). Pressurized fluid source 130 is configured to deliver a pressurized fluid, such as pressurized gas, to inflate evacuation slide 120. Pressurized fluid source 130 is fluidly coupled to evacuation slide 120. For example, pressurized fluid source 130 may be fluidly coupled to evacuation slide 120 via a hose, or conduit, 132. In response to receiving pressurized fluid from pressurized fluid source 130, evacuation slide 120 begins to inflate.

In accordance with various embodiments, conduit 132 may be connected to a valve outlet 138 of a valve assembly 140 (also referred to herein as a pressure regulator shutoff valve or a solenoid operated pressure regulator cum shut off valve) fluidly coupled to pressurized fluid source 130. In this regard, valve assembly 140 is fluidly coupled between pressurized fluid source 130 and conduit 132. As described in further detail below valve assembly 140 is configured to regulate the flow of pressurized fluid from pressurized fluid source 130 to evacuation slide 120. In this regard, when evacuation slide 120 is in a stowed (or deflated) state, valve assembly 140 is in a closed position. In response to deployment of evacuation assembly 106, valve assembly 140 translates to an open position, thereby allowing fluid to flow from pressurized fluid source 130 to evacuation slide 120.

Figure 3:
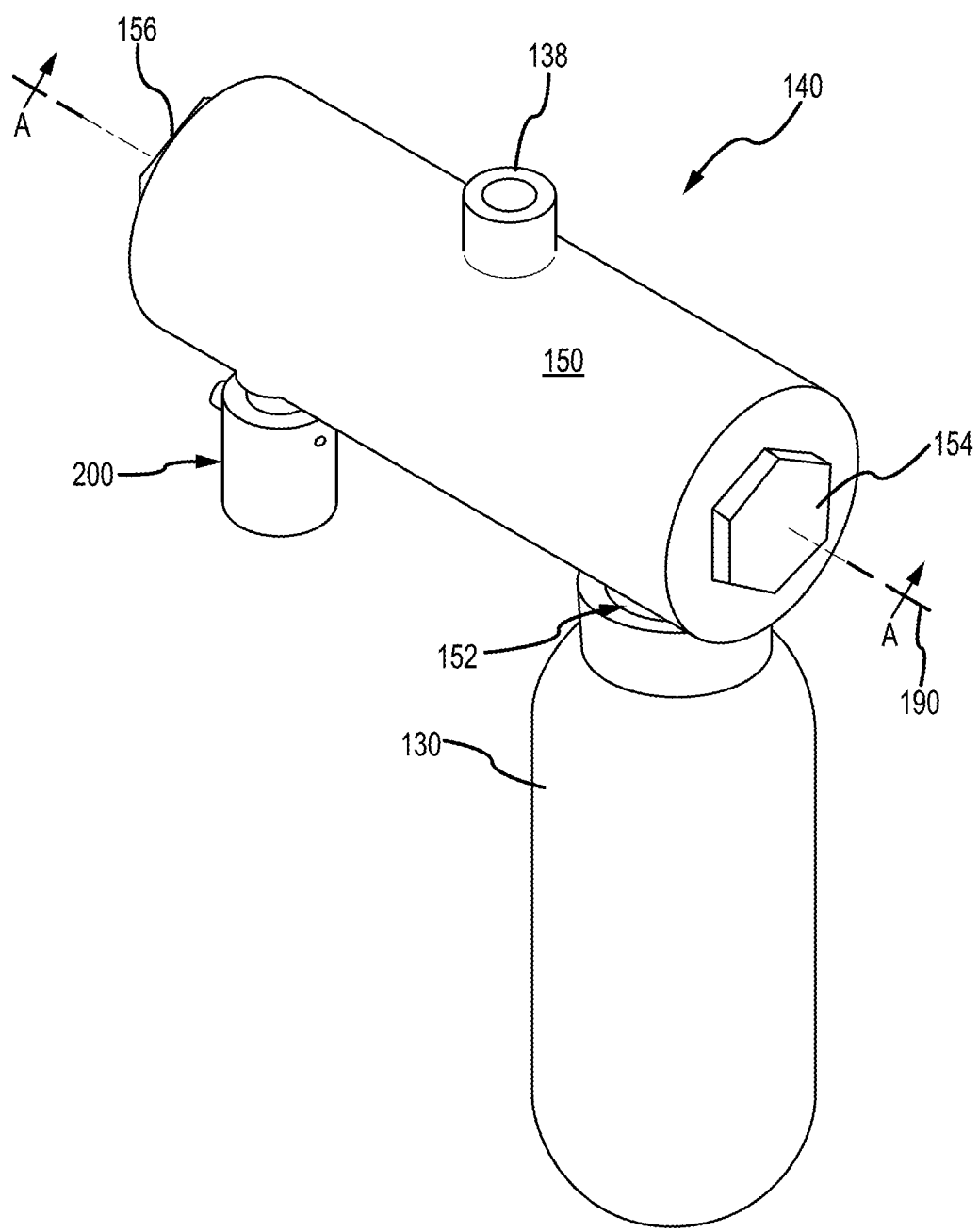
FIG. 3 illustrates a perspective view of a pressurized fluid source for an evacuation assembly, in accordance with various embodiments.

With reference to FIG. 3, additional details of valve assembly 140 are illustrated. In accordance with various embodiments, valve assembly 140 includes a valve housing 150 (sometime referred to as a valve manifold). In various embodiments, valve housing 150 may comprise an elongate cylindrical geometry extending along longitudinal axis 190. Valve housing 150 may be cylindrical shaped and provided with minimal numbers of internal flow passages. Valve housing 150 may be additively manufactured. Valve housing 150 may be manufactured using conventional machining methods. In this case, the internally provided flow passages may be drilled from the extreme side faces and the relevant openings plugged afterwards.

Valve housing 150 may define valve outlet 138 and a valve inlet 152 of valve assembly 140. Valve assembly 140 receives fluid from pressurized fluid source 130 through valve inlet 152. A first cap 154 may form a fluid tight seal with valve housing 150. A second cap 156 may form a fluid tight seal with valve housing 150. First cap 154 may be disposed opposite valve housing 150 from second cap 156. In various embodiments, first cap 154 and second cap 156 are coaxial with axis 190. Valve assembly 140 includes a solenoid initiator valve 200. Solenoid initiator valve 200 may be a dual solenoid valve. Solenoid initiator valve 200 may operate to place valve outlet 138 in fluid communication with valve inlet 152, as described herein.

Other components of pressurized fluid source 130 may also be coupled to valve housing 150. For example, in various embodiments, a pressure gauge, configured to measure a pressure of pressurized fluid source 130, may be operatively coupled to pressurized fluid source 130 via valve assembly 140.

With additional reference to FIG. 4A, a cross-section view (taken along the longitudinal axis 190 (also line A-A) in FIG. 3) of valve assembly 140 in the closed position is illustrated. In accordance with various embodiments, valve housing 150 may define valve inlet 152 and valve outlet 138 of valve assembly 140. Valve housing 150 may further define a main fluid channel 164 through valve housing 150. Main fluid channel 164 may be coaxial with longitudinal axis 190. Main fluid channel 164 may be fluidly connected with valve inlet 152 and valve outlet 138.

A spool 165 is located in main fluid channel 164. In the closed position, spool 165 blocks, or otherwise prevents, the flow of pressurized fluid from pressurized fluid source 130 to valve outlet 138. In the closed position, a spring 201 (also referred to herein as a first spring) biases the spool 165 in a first direction (i.e., to the left in FIG. 4A) towards second cap 156 to secure spool 165 in the closed position. In various embodiments, spring 201 biases the spool 165 to abut second cap 156 in the closed position. Moreover, in the closed position, fluid pressure from pressurized fluid source 130 biases the spool 165 towards second cap 156 to secure spool 165 in the closed position. In this manner, fluid pressure from pressurized fluid source 130 and spring force from first spring 201 generates an interference with spool 165 that blocks spool 165 from translating in a second direction (i.e., to the right in FIG. 4B) along longitudinal axis 190 toward cap 154—i.e., that blocks spool 165 from translating to/toward an open position.

Spool 165 may comprise a spool stem 166. Spool stem 166 may comprise an elongate rod. Spool 165 may be coaxial with longitudinal axis 190. Spool 165 may comprise a piston 167 (also referred to herein as a first piston) extending from a first end (i.e., the right end of spool stem 166 in FIG. 4B) of spool stem 166. Piston 167 may abut and seal against valve housing 150. Spool 165 may comprise a piston 168 (also referred to herein as a second piston) extending from a second end (i.e., the left end of spool stem 166 in FIG. 4B) of spool stem 166. Piston 168 may abut and seal against a guide bushing 158. Spool 165 may comprise a piston 169 (also referred to herein as a third piston) extending from piston 168. Piston 169 may abut and seal against valve housing 150.

Valve assembly 140 may further comprise the guide bushing 158 located in main fluid channel 164. Guide bushing 158 may be fixed to valve housing 150. Guide bushing 158 may be disposed between outlet 138 and second cap 156. Guide bushing 158 may be disposed between outlet 138 and solenoid initiator valve 200. Spool 165 may be disposed at least partially within guide bushing 158. Spool 165 may extend through guide bushing 158. Guide bushing 158 may guide translation of spool 165 along longitudinal axis 190 within main fluid channel 164.

Valve assembly 140 may further comprise a poppet valve 160 (also referred to herein as a regulator valve) located in main fluid channel 164. Poppet valve 160 may be disposed at least partially within guide bushing 158. A first end of poppet valve 160 may extend into guide bushing 158. A second end of poppet valve 160 may abut a second spring 202 (also referred to herein as a regulator spring). Valve housing 150 may comprise a wall or flange 151 extending inward toward longitudinal axis 190 into main fluid channel 164. Regulator spring 202 may be disposed between flange 151 and poppet valve 160. Regulator spring 202 may abut flange 151. Regulator spring 202 may be disposed opposite flange 151 from piston 167. Guide bushing 158 may comprise a wall or flange 159 extending inward toward longitudinal axis 190 into main fluid channel 164. Poppet valve 160 may be disposed between flange 159 and regulator spring 202. Poppet valve 160 may abut flange 159. Regulator spring 202 may bias poppet valve 160 along longitudinal axis 190 in the first direction (i.e., to the left in FIG. 4A) to/toward an open position.

Poppet valve 160 may be disposed about spool 165. Stated differently, poppet valve 160 may surround a portion of spool stem 166. Spool 165 may extend through poppet valve 160. More specifically, spool stem 166 may extend through poppet valve 160. Spool 165 may extend through flange 159 and flange 151. More specifically, spool stem 166 may extend through flange 159 and flange 151. Spool 165, poppet valve 160, and guide bushing 158 may be coaxial with longitudinal axis 190. Spool 165 may guide translation of poppet valve 160 along longitudinal axis 190 within main fluid channel 164. Flange 151 may guide translation of spool 165 along longitudinal axis 190 within main fluid channel 164.

Poppet valve 160 may comprise a piston 161 (also referred to herein as a first piston or a regulator piston). Poppet valve 160 may comprise a piston 162 (also referred to herein as a second piston or a regulator piston). Valve assembly 140 may further comprise a channel 136 (also referred to herein as a fluid feed channel) whereby valve outlet 138 is configured to receive a flow of pressurized fluid from valve inlet 152 in response to spool 165 moving to an open position. Channel 136 may be configured to feed the flow of pressurized fluid from valve inlet 152 to a location of main fluid channel 164 between piston 161 and piston 162. In the closed position, piston 167 may hermetically seal valve inlet 152 from channel 136 and valve outlet 138. Moreover, in the closed position, solenoid initiator valve 200 may hermetically seal valve inlet 152 from fluid communication with piston 169.

Valve assembly 140 may further comprise a channel 134 (also referred to herein as a pilot feed channel) whereby a flow of pressurized fluid from pressurized fluid source 130 may be routed to solenoid initiator valve 200. Channel 134 may bypass main fluid channel 164 and route the flow of pressurized fluid directly to solenoid initiator valve 200.

Figure 4B:
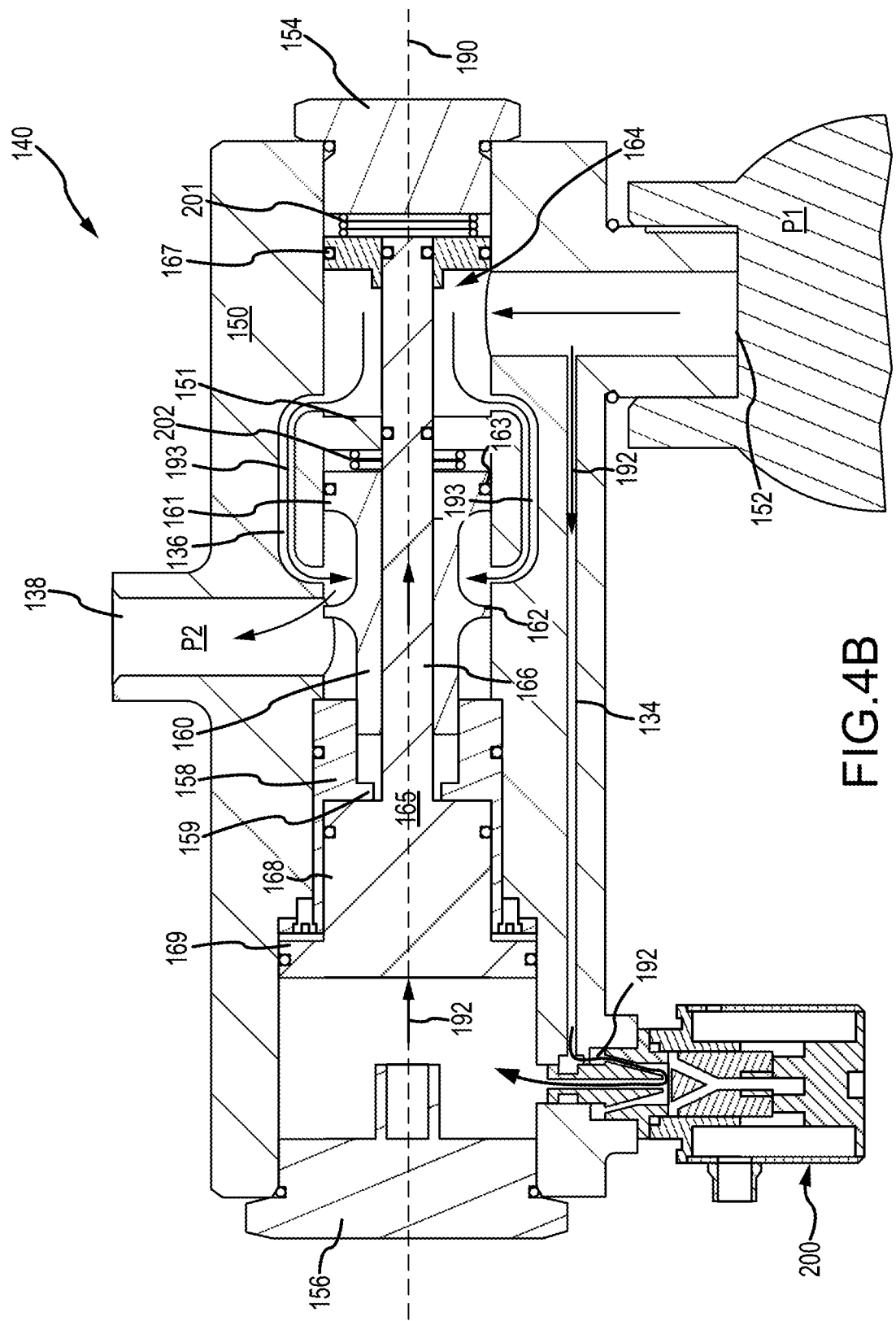
FIG. 4B illustrates a cross-section view of a pressurized fluid source valve assembly taken along the line A-A in FIG. 3, with the valve assembly in an open position, in accordance with various embodiments.

Referring to FIG. 4B, a cross-section view (taken along the longitudinal axis 190 (also line A-A) in FIG. 3) of valve assembly 140 in the open position, is illustrated. In accordance with various embodiments, solenoid initiator valve 200 may move from a closed position (see FIG. 4A) to an open position (see FIG. 4B) whereby a flow of pressurized fluid (represented by arrows 192) from pressurized fluid source 130 may be routed through solenoid initiator valve 200 into main fluid channel 164. In response to solenoid initiator valve 200 moving to the open position, pressurized fluid 192 from pressurized fluid source 130 may flow through channel 134 into solenoid initiator valve 200, and from solenoid initiator valve 200 into main fluid channel 164. A force from said pressurized fluid 192 may act on piston 169 and overcome the bias of spring 201 to move spool 165 along longitudinal axis 190 toward first cap 154 with respect to valve housing 150. When the fluid pressure force acting on piston 169 overcomes the bias of the spring force of spring 201 and the pressure force of pressurized fluid from pressurized fluid source 130 acting on piston 167, the spool 165 may begin to translate along longitudinal axis 190 in the second direction (i.e., to the right in FIG. 4B) towards first cap 154. The diameter of piston 169 may be greater than the diameter of piston 167 such that the surface area of piston 169 is greater than that of piston 167. In this regard, the force of pressurized fluid 192 acting on piston 169 will be greater than the force of pressurized fluid acting on piston 167, even though the pressure of the pressurized fluid acting on both pistons 167, 169 may be the same.

As piston 167 translates toward the open position, the valve inlet 152 may be placed in fluid communication with channel 136 and a flow of pressurized fluid (represented by arrows 193) from pressurized fluid source 130 may be routed to the poppet valve 160 inlet cavity (i.e., between piston 161 and piston 162). Stated differently, in response to spool 165 moving to the open position (see FIG. 4B), pressurized fluid (represented by arrows 193) from pressurized fluid source 130 may flow around spool stem 166 into main fluid channel 164 and out main fluid channel 164 through valve outlet 138. The flow of pressurized fluid 193 may be routed by channel 136 into main fluid channel 164 at a location between piston 161 and piston 162. In this manner, the pressurized fluid 193 applies a force (also referred to herein as a throttling down force) to piston 161 which tends to cause poppet valve 160 to translate in the second direction (i.e., to the right in FIG. 4B) along longitudinal axis 190 against the bias of regulator spring 202. The pressurized fluid 193 also applies a force (also referred to herein as a throttling up force) to piston 162 which tends to cause poppet valve 160 to translate in the first direction (i.e., to the left in FIG. 4B) along longitudinal axis 190, thereby providing more. Poppet valve 160 may occupy an intermediate position controlled by the force balancing between the above-mentioned opening and closing forces.

As the inflation progresses, the pressure (P1) of pressurized fluid source 130 may reduce and the poppet valve 160 closing force likewise reduces. This causes the poppet valve 160 to progressively move further towards the open position (i.e., to the left in FIG. 4B) to increase the valve flow to maintain the pressure (P2) of valve outlet 138 within a desired envelope. Piston 161 may include a seal 163, such as a dynamic O-ring for example. The friction force of seal 163 may be considered as a resistance force to regulator opening when designing for force balancing of poppet valve 160.

Figure 5A:
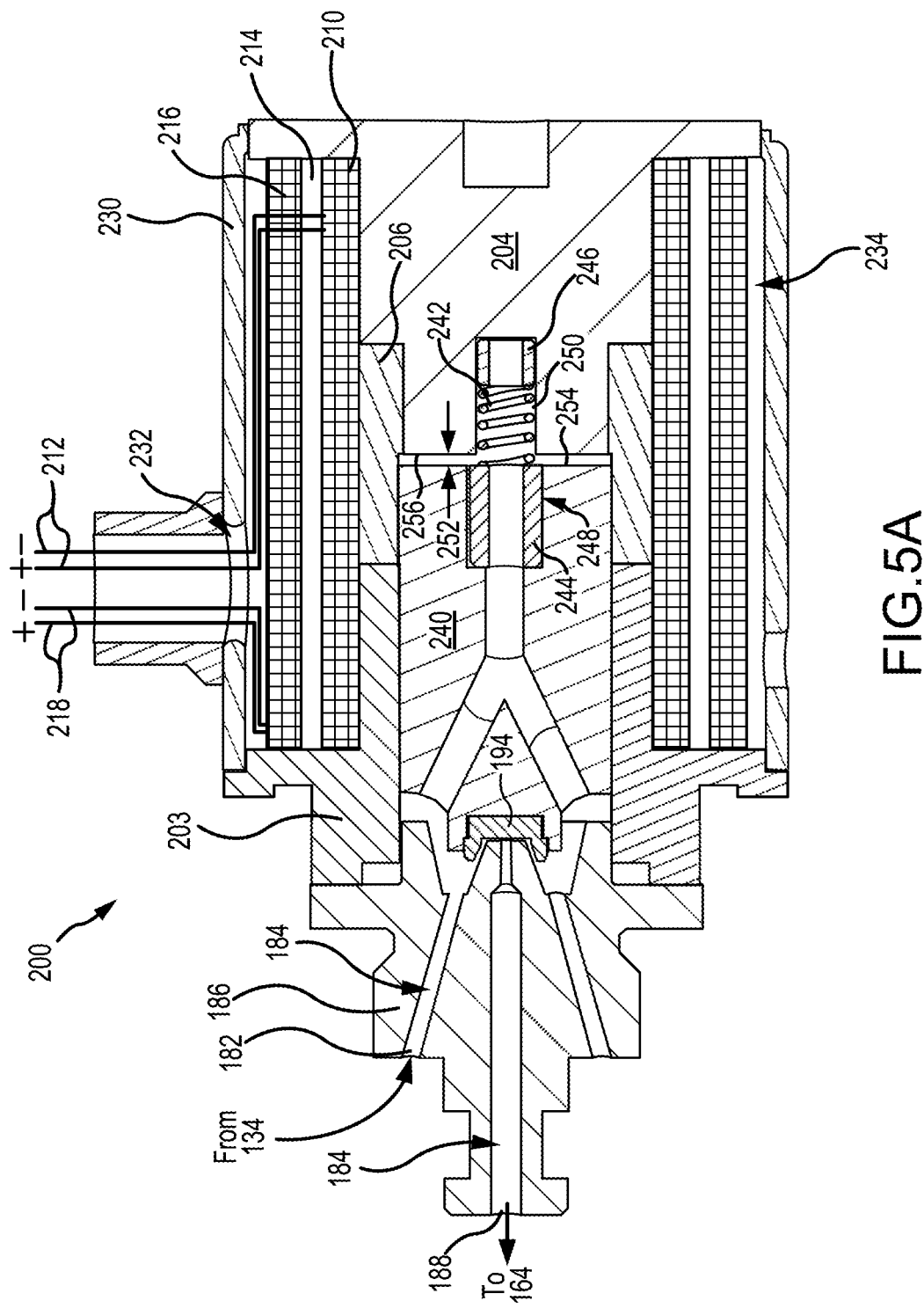
FIG. 5A illustrates a cross-section view of a dual solenoid valve in the closed position, in accordance with various embodiments.

With reference to FIG. 5A, additional details of dual solenoid valve 200 are illustrated, in accordance with various embodiments. In FIG. 5A, dual solenoid valve 200 is in the closed position. Dual solenoid valve 200 includes a core 203 and a bobbin 204. Core 203 may engage fluid fitting 186. Bobbin 204 may engage core fitting 206. Core fitting 206 is formed of a non-magnetic material. Core 203 and bobbin 204 are made of a magnetic material, such as a ferrous metal.

In accordance with various embodiments, a first (or inner) solenoid coil 210 is wrapped helically around core 203, bobbin 204, and core fitting 206. A first set of lead wires 212 (e.g., a positive lead wire and a ground lead wire) is electrically coupled to first solenoid coil 210. An insulating layer 214 is formed over an outer diameter of first solenoid coil 210. Stated differently, insulating layer 214 is radially outward of first solenoid coil 210. Insulating layer 214 may comprise one or more layers of epoxy or phenolic based resin, polyimide, lead(II) oxide (PbO), silicon dioxide (SiO2), silicon nitride (Si3N4), silicon oxynitride (SiON), tantalum pentoxide (Ta2O5), aluminum oxide (Al2O3), or other material having similar electrically insulating properties.

A second (or outer) solenoid coil 216 is wrapped helically around insulating layer 214. A second set of lead wires 218 is electrically coupled to second solenoid coil 216. Second solenoid coil 216 is radially outward of first solenoid coil 210 and insulating layer 214. Insulating layer 214 is located radially between second solenoid coil 216 and first solenoid coil 210.

First and second solenoid coils 210, 216 are arranged such that, in response to receiving a constant voltage from a power source, the magnetic flux direction generated by first solenoid coil 210 is in the same direction as the magnetic flux direction generated by second solenoid coil 216. In various embodiments, second solenoid coil 216 may be designed (e.g., the wire gauge of second solenoid coil 216 and the winding depth of second solenoid coil 216 are selected) to generate a magnetic flux value, or ampere-turns, that is equal to the magnetic flux value, or ampere-turns, generated by first solenoid coil 210.

Figure 6:
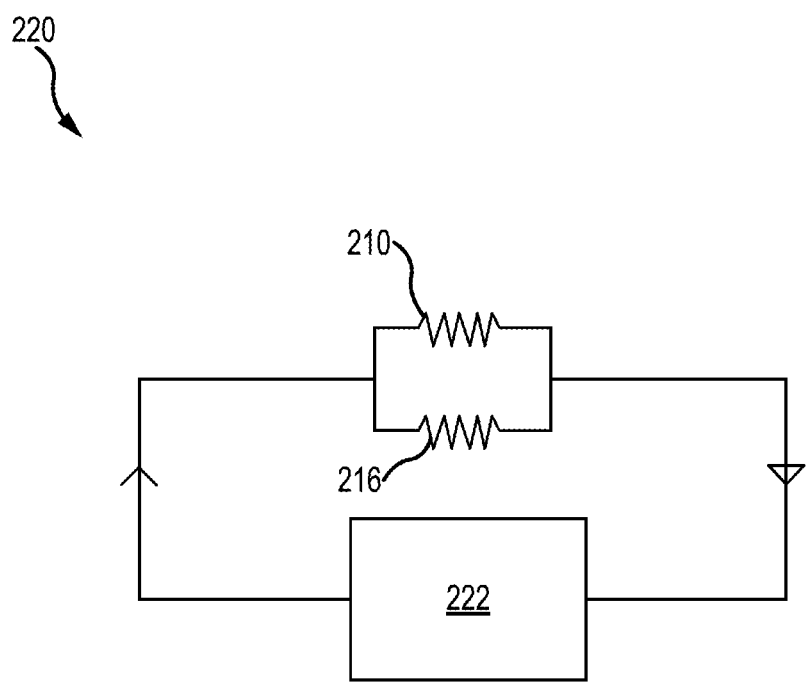
FIG. 6 illustrates a schematic of an electrical circuit including dual solenoid coils, in accordance with various embodiments.

With reference to FIG. 6, a schematic of an electrical circuit 220 including first and second solenoid coils 210, 216 is illustrated. In various embodiments, second solenoid coil 216 may be arranged in parallel with first solenoid coil 210. A current may be supplied to first and second solenoid coils 210, 216 from a power source 222. Power source 222 may be configured to output a constant (e.g., direct) current.

When both first solenoid coil 210 and second solenoid coil 216 are functioning and generating magnetic flux (i.e., when neither first solenoid coil 210 nor second solenoid coil 216 is broken or otherwise not generating magnetic flux), the current passing through each of first solenoid coil 210 and second solenoid coil 216 will be proportionate to the respective coil resistance values. In accordance with various embodiments, the magnetic field generated by first solenoid coil 210 and second solenoid coil 216 together will be additive. For example, if the solenoid resistance coil value of first solenoid coil 210 is equal to the solenoid resistance coil value of second solenoid coil 216, the current passing through each of first solenoid coil 210 and second solenoid coil 216 is equal, or approximately equal, to one-half of the current output by power source 222. Should either first solenoid coil 210 or second solenoid coil 216 fail (e.g., break or otherwise stop current flow through the solenoid coil), the total current output by power source 222 will pass through the fault-free solenoid coil. Thus, the total magnetic flux, or ampere-turns, generated by the dual solenoid valve 200, with momentary reference to FIG. 5A, will be same when both first solenoid coil 210 and second solenoid coil 216 are working properly and when one of first solenoid coil 210 or second solenoid coil 216 is working properly and the other of first solenoid coil 210 and second solenoid coil 216 is faulty.

Returning to FIG. 5A, a cover 230 may be located around second solenoid coil 216. Cover 230 may be coupled, via adhesive, welding, fasteners, or any other suitable attachment to bobbin 204 and/or to core 203. Cover 230 may define a lead wire opening 232 through which the first set of lead wires 212 and the second set of lead wires 218 are located. Cover 230, bobbin 204, core 203, and core fitting 206 define a cavity 234 in which first solenoid coil 210, insulating layer 214, and second solenoid coil 216 are located.

Dual solenoid valve 200 further includes a plunger 240. Plunger 240 comprises a ferrous metal. Plunger 240 is configured such that plunger 240 will translate in the magnetic flux direction generated by first and second solenoid coils 210, 216. In this regard, the magnetic field generated by first and second solenoid coils 210, 216 forces plunger 240 away from fluid fitting 186. Valve seal 194 is coupled to plunger 240 such that valve seal 194 translates with plunger 240 relative to fluid fitting 186. Plunger 240 is biased toward fluid fitting 186. In various embodiments, a coil spring 242 may bias plunger 240 toward fluid fitting 186. Coil spring 242 may be located between a spacer 244 of plunger 240 and a spacer 246 of bobbin 204. Spacer 244 may be located in a spacer cavity 248 defined by plunger 240. Spacer 246 may be located in spacer cavity 250 defined by bobbin 204. The biasing load generated by coil spring 242 may be applied to plunger 240 via spacer 244. In various embodiments, spacer 244 comprises a non-magnetic material.

In the closed position, the biasing load applied by coil spring 242 to plunger 240 creates a gap 252 between a surface 254 of plunger 240 and a surface 256 of bobbin 204. In the closed position, the biasing load applied by coil spring 242 to plunger 240 maintains a fluid tight seal between fluid fitting 186 and valve seal 194.

Referring now to FIG. 5B, dual solenoid valve 200 is illustrated in the open position. In response to receiving a current via first set of lead wires 212 and/or second set of lead wires 218, first solenoid coil 210 and/or second solenoid coil 216 generate a magnetic field. In various embodiments, current begins to flow to first solenoid coil 210 and/or second solenoid coil 216 in response to activation of power source 222. Power source 222 may be activated in response to deployment of evacuation assembly 106 (FIG. 1). For example, opening exit door 104 (FIG. 1) may activate power source 222 (FIG. 6) and/or close a circuit to electrically couple power source 222 to first and second solenoid coils 210, 216, and/or otherwise cause current to flow from power source 222 to first and second solenoid coils 210, 216. The electromagnetic force due to the magnetic flux value, or ampere-turns, generated by first solenoid coil 210 and/or by second solenoid coil 216 is greater than the biasing load applied by coil spring 242. The electromagnetic force being greater than the biasing load applied by coil spring 242, causes plunger 240 and valve seal 194 to translate away from fluid fitting 186, thereby creating a gap 260 between valve seal 194 and fluid fitting 186.

With combined reference to FIG. 4B and FIG. 5B, the gap 260 between valve seal 194 and fluid fitting 186 fluidly connects inlet 182 and outlet 188 of fluid fitting 186, thereby allowably fluid from pressurized fluid source 130 to flow from channel 134 to the main fluid channel 164 at the location of piston 169. In the open position, fluid from pressurized fluid source 130 may flow from valve inlet 152, through channel 134 in valve housing 150 and fluid path 184 in fluid fitting 186, and into the main fluid channel 164 at the location of piston 169. The increase in fluid volume in main fluid channel 164 at the location of piston 169 increases a pressure within main fluid channel 164 at the location of piston 169. The increase in pressure within main fluid channel 164 at the location of piston 169 forces spool 165 to translate in the second direction (i.e., to the right in FIG. 4B) toward first cap 154. In this regard, spool 165 translates toward the open position in response to the pressure force acting on piston 169 exceeding the biasing force applied by spring 201 and the pressure force acting on piston 167. In response to the spool 165 translating to the open position, channel 136 is exposed to valve inlet 152. In response to the piston 167 moving from the closed position wherein piston 167 is located at a first side of valve inlet 152 (see FIG. 4A) to an open position wherein piston 167 is located at a second side of valve inlet 152 (see FIG. 4B), fluid is allowed to flow from valve inlet 152, through main fluid channel 164 and channel 136, across poppet valve 160 and out valve outlet 138. In this regard, in the open position, spool 165 does not block valve outlet 138 and fluid from pressurized fluid source 130 may flow out valve outlet 138 and to evacuation slide 120 (FIG. 2).

Valve assembly 140 including a dual solenoid valve 200 may increase the reliability of valve assembly 140 and evacuation assembly 106 by providing a redundant solenoid coil. The redundant solenoid coil allows valve assembly 140 to translate to the open position should either of first solenoid coil 210 or second solenoid coil 216 break or otherwise fail.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods, and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed:

1. A valve arrangement for a pressurized fluid source, the valve arrangement comprising:
    a valve housing comprising an inlet, an outlet, and a main fluid channel extending along a longitudinal axis of the valve housing;
    a spool located in the main fluid channel, the spool configured to translate along the longitudinal axis of the valve housing;
    a poppet valve located around the spool, the poppet valve configured to translate along the longitudinal axis of the valve housing; and
    a fluid feed channel that is distinct from the main fluid channel, wherein:
        the fluid feed channel is fluidly disconnected from the inlet of the valve housing when the spool is in a closed position,
        the fluid feed channel is fluidly connected with the inlet of the valve housing when the spool is in an open position,
        the outlet is fluidly connected with the inlet of the valve housing by the fluid feed channel when the spool is in the open position, and
        the poppet valve regulates a flow of a fluid from the inlet to the outlet when the spool is in the open position.

2. The valve arrangement of claim 1, wherein the poppet valve is configured to translate along the longitudinal axis of the valve housing independent of the spool.

3. The valve arrangement of claim 2, wherein the spool comprises a first piston, a second piston, and a third piston.

4. The valve arrangement of claim 3, further comprising a first spring adjacent the first piston.

5. The valve arrangement of claim 4, further comprising a second spring adjacent the poppet valve.

6. The valve arrangement of claim 5, wherein the poppet valve is disposed between the first piston and the second piston.

7. The valve arrangement of claim 6, wherein the poppet valve comprises a first regulator piston and a second regulator piston.

8. The valve arrangement of claim 6, further comprising:
    a solenoid valve configured to open and close the valve arrangement; and
    a pilot feed channel whereby the solenoid valve is in fluid communication with the valve inlet.

9. A valve arrangement for a pressurized fluid source, the valve arrangement comprising:
    a valve housing comprising an inlet, an outlet, a main fluid channel extending along a longitudinal axis of the valve housing, and a flange extending axially inward into the main fluid channel;
    a spool located in the main fluid channel and comprising a first piston, the spool and the first piston are configured to translate together along the longitudinal axis of the valve housing between a closed position and an open position;
    a poppet valve located coaxially with the spool, the poppet valve configured to translate along the longitudinal axis of the valve housing;
    a regulator spring disposed between the poppet valve and the flange, the regulator spring is configured to bias the poppet valve toward an open position, and the spring is located opposite the flange from the first piston;
    wherein the poppet valve is fluidly disconnected from the inlet via the first piston when the spool is in the closed position, and
    the poppet valve is fluidly connected with the inlet when the spool is in the open position.

10. The valve arrangement of claim 9, wherein the main fluid channel fluidly connects the valve inlet and the valve outlet.

11. The valve arrangement of claim 9, wherein the spool is configured to fluidly seal the valve outlet from the valve inlet when the spool is in the closed position.

12. The valve arrangement of claim 9, further comprising:
    a dual solenoid valve configured to open and close the valve assembly, the dual solenoid valve comprising:
        a bobbin;
        a first solenoid coil located around the bobbin;
        a second solenoid coil located radially outward of the first solenoid coil;
        an insulating layer located between the first solenoid coil and the second solenoid coil; and
        a plunger biased away from the bobbin.

13. The valve arrangement of claim 12, wherein the dual solenoid valve further comprises a fluid fitting defining a fluid path, wherein the fluid path is configured to fluidly connect the main fluid channel at a location of an end of the spool and the inlet of the valve housing.

14. The valve arrangement of claim 13, wherein in the closed position, the dual solenoid valve is configured to seal an outlet of the fluid path defined by the fluid fitting from an inlet of the fluid path defined by the fluid fitting.

15. The valve arrangement of claim 14, wherein the dual solenoid valve further comprises a valve seal configured to form a sealing interface with the fluid fitting when the valve assembly is in the closed position, and wherein in an open position, a gap is created between the fluid fitting and the valve seal, the gap being configured to allow fluid to flow from the inlet of the fluid path to the outlet of the fluid path.

16. The valve arrangement of claim 15, further comprising:
  a first set of lead wires electrically coupled to the first solenoid coil; and
  a second set of lead wires electrically coupled to the second solenoid coil.

17. The valve arrangement of claim 9, wherein the spool further comprises a second piston movable together with the spool and a third piston movable together with the spool.

18. An evacuation assembly, comprising:
  a pressurized fluid source; and
  a valve assembly configured to control a flow of pressurized fluid from the pressurized fluid source, the valve assembly comprising:
    a valve housing comprising an inlet, an outlet, and a main fluid channel extending along a longitudinal axis of the valve housing;
    a spool located in the main fluid channel, the spool configured to translate along the longitudinal axis of the valve housing between a closed position and an open position;
    a poppet valve located coaxially with the spool, the poppet valve configured to translate along the longitudinal axis of the valve housing; and
    a fluid feed channel that is distinct from the main fluid channel, wherein:
      the fluid feed channel is fluidly disconnected from the inlet of the valve housing when the spool is in a closed position,
      the fluid feed channel is fluidly connected with the inlet of the valve housing when the spool is in an open position,
      the outlet is fluidly connected with the inlet of the valve housing by the fluid feed channel when the spool is in the open position, and
      the poppet valve regulates a flow of a fluid from the inlet to the outlet when the spool is in the open position.

19. The evacuation assembly of claim 18, further comprising a dual solenoid valve configured to open and close the valve assembly, the dual solenoid valve including a first solenoid coil and a second solenoid coil arranged in parallel with the first solenoid coil.

20. The evacuation assembly of claim 19, further comprising an evacuation slide fluidly coupled to the valve outlet.

* * * * *